(12) United States Patent
Zhang et al.

(10) Patent No.: US 11,374,802 B2
(45) Date of Patent: Jun. 28, 2022

(54) DATA TRANSMISSION METHOD, APPARATUS AND DEVICE BASED ON MODULATED SIGNAL, AND STORAGE MEDIUM

(71) Applicant: ZTE CORPORATION, Shenzhen (CN)

(72) Inventors: Bo Zhang, Shenzhen (CN); Bo Sun, Shenzhen (CN); Qinghe Du, Shenzhen (CN); Aoqin Duan, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 234 days.

(21) Appl. No.: 16/636,085

(22) PCT Filed: Jun. 20, 2018

(86) PCT No.: PCT/CN2018/092042
§ 371 (c)(1),
(2) Date: Apr. 27, 2020

(87) PCT Pub. No.: WO2019/024620
PCT Pub. Date: Feb. 7, 2019

(65) Prior Publication Data
US 2021/0399928 A1 Dec. 23, 2021

(30) Foreign Application Priority Data
Aug. 2, 2017 (CN) .......................... 201710652076.6

(51) Int. Cl.
*H04L 27/00* (2006.01)
*H04L 5/00* (2006.01)
*H04L 27/04* (2006.01)

(52) U.S. Cl.
CPC ........ *H04L 27/0014* (2013.01); *H04L 5/0044* (2013.01); *H04L 27/04* (2013.01)

(58) Field of Classification Search
CPC ............ H04L 2027/0018; H04L 27/00; H04L 27/0014; H04L 27/04; H04L 5/0044
See application file for complete search history.

(56) References Cited

U.S. PATENT DOCUMENTS

| | | | | |
|---|---|---|---|---|
| 5,502,744 A | * | 3/1996 | Marshall | ............. H04L 27/3488 375/259 |
| 2001/0055353 A1 | * | 12/2001 | Rybicki | ............... H04B 10/114 375/353 |

(Continued)

FOREIGN PATENT DOCUMENTS

| | | |
|---|---|---|
| CN | 1161601 A | 10/1997 |
| CN | 1494284 A | 5/2004 |

(Continued)

OTHER PUBLICATIONS

Translated Chinese Office Action.
Translated Office Action.
European Search Report.

(Continued)

*Primary Examiner* — Khanh C Tran
(74) *Attorney, Agent, or Firm* — Bond Schoeneck & King, PLLC; George McGuire

(57) ABSTRACT

Introduced are a data transmission method, apparatus and device based on a modulation signal and a storage medium. The method includes steps as follows: calculating a first amplitude-modulated sine wave signal and a second amplitude-modulated sine wave signal with each preset frequency individually; based on the first amplitude-modulated sine wave signal and the second amplitude-modulated sine wave signal with the each preset frequency and according to a preset mapping rule, mapping a sequence of data bits to be sent into a signal sequence; and processing the signal sequence to generate a transmittable radio-frequency signal, and sending the transmittable radio-frequency signal to a receiving end.

19 Claims, 12 Drawing Sheets

(56) References Cited

U.S. PATENT DOCUMENTS

| | | | | |
|---|---|---|---|---|
| 2003/0027542 A1* | 2/2003 | Hediger | ................ | H04L 27/02 |
| | | | | 455/295 |
| 2004/0071225 A1* | 4/2004 | Suzuki | .................... | H03F 3/24 |
| | | | | 375/297 |
| 2018/0205493 A1* | 7/2018 | Yang | .................... | H04L 1/0041 |

FOREIGN PATENT DOCUMENTS

| | | | |
|---|---|---|---|
| CN | 1588932 | A | 3/2005 |
| CN | 101060381 | A | 10/2007 |
| CN | 102104577 | A | 6/2011 |
| CN | 102130755 | A | 7/2011 |
| CN | 102217266 | A | 10/2011 |
| CN | 102546519 | A | 7/2012 |
| CN | 202524419 | U | 11/2012 |
| JP | H04304727 | A | 10/1992 |
| WO | 2010138442 | A1 | 12/2010 |

OTHER PUBLICATIONS

Duan Aoqin et al: "Waveform Design of UNB Modulation and Performance Analysis", Communications and Networking: 12th International Conference, Chinacom 2017, Xi 'an, China, Oct. 10-12, 2017, Proceedings, Part I, vol. 236, Jan. 1, 2017 (Jan. 1, 2017), pp. 84-94, XP055784083, DE DOI: 10.1007/978-3-319-78130-3_10 ISBN: 978-3-642-17758-3.

Zhang Yu et al: "The Communication Systems Based on an Enhanced VWDK Technique: Performance Analysis and the Application on Amplitude Modulation", Communications and Mobile Computing, 2009. CMC '09. WRI International Conference on, IEEE, Piscataway, NJ, USA, Jan. 6, 2009 (Jan. 6, 2009), pp. 151-155, XP031434644, ISBN: 978-0-7695-3501-2.

International Search Report and Written Opinion Form PCT/ISA/210 and PCT/ISA237, International Application No. PCT/CN2018/092042 pp. 1-5, International Filing Date Jun. 20, 2018, mailing date of search report dated Jul. 31, 2018.

* cited by examiner

DATA TRANSMISSION METHOD, APPARATUS AND DEVICE BASED ON MODULATED SIGNAL, AND STORAGE MEDIUM

CROSS-REFERENCES TO RELATED APPLICATIONS

The present application is a U.S. National Stage Application, filed under 35 U.S.C. 371, of International Patent Application No. PCT/CN2018/092042, filed on Jun. 20, 2018, which is based on and claims a priority to Chinese patent application No. 201710652076.6 filed on Aug. 2, 2017, disclosure of which are incorporated herein by reference in its their entireties.

TECHNICAL FIELD

Embodiments of the present disclosure relate to the technical field of digital information transmission, but are not limited to a data transmission method, a data transmission apparatus and a data transmission device based on a modulation signal, and a storage medium.

BACKGROUND

With the rapid development of communication technologies, requirements on high efficiency, timeliness and reliability of information transmission in modern society are synchronously increased. Frequency spectrum resources have become scarce and important strategic resources at present, and problems of utilization and development of radio frequency spectrum resources are more and more prominent. In order to obtain a data communication information solution with high transmission efficiency and low bit error rate, various new modulation technologies are continuously emerging in recent years, transmission is performed at a higher bit rate (in bps/Hz as a dimension) in a unit band, and a high band utilization rate and a low bit error rate are used as key indexes of a narrow-band modulation technology for coping with the current frequency spectrum shortage. In the existing art, modulation signal waveform expressions corresponding to different bit sequence groups are provided, however, due to a reason of signal period components, the existence of the high-order discrete line spectrum greatly extends a frequency spectrum bandwidth.

SUMMARY

Embodiments of the present disclosure provide a data transmission method, a data transmission apparatus and a data transmission device based on a modulation signal, and a storage medium. Under a condition of the same signal bandwidth as existing solutions, the difference between adjustment signals is adjusted, so that a higher signal detection capability is obtained, and the bit error rate of data transmission is reduced.

A data transmission method based on a modulation signal provided in the embodiments of the present disclosure is applied to a transmitting end and includes steps described below:

calculating a first amplitude-modulated sine wave signal and a second amplitude-modulated sine wave signal with each preset frequency individually;

based on the first amplitude-modulated sine wave signal and the second amplitude-modulated sine wave signal with the each preset frequency and according to a preset mapping rule, mapping a sequence of data bits to be sent into a signal sequence; and processing the signal sequence to generate a transmittable radio-frequency signal, and sending the transmittable radio-frequency signal to a receiving end.

A data transmission apparatus based on a modulation signal further provided in the embodiments of the present disclosure is applied to a transmitting end and includes a calculating module, a mapping module and a sending module.

The calculating module is arranged to calculate a first amplitude-modulated sine wave signal and a second amplitude-modulated sine wave signal with each preset frequency individually.

The mapping module is arranged to map, based on the first amplitude-modulated sine wave signal and the second amplitude-modulated sine wave signal with the each preset frequency and according to a preset mapping rule, a sequence of data bits to be sent into a signal sequence.

The sending module is arranged to process the signal sequence to generate a transmittable radio-frequency signal, and send the transmittable radio-frequency signal to a receiving end.

A data transmission device based on a modulation signal further provided in the embodiments of the present disclosure includes a memory and a processor, where the memory stores computer programs executable on the processor and the processor implements steps of the data transmission method based on the modulation signal described above when the programs are executed by the processor.

A computer-readable storage medium further provided in the embodiments of the present disclosure stores computer programs for implementing steps of the data transmission method based on the modulation signal described above when the computer programs are executed by a processor.

In the data transmission method, apparatus and device based on a modulation signal, and the storage medium provided in the embodiments of the present disclosure, advantages of the traditional digital communication technology are reserved, the spectrum bandwidth of the transmitted signal is directly or indirectly constrained, the Euclidean distance between the digital signal modulation waveforms is maximized, and the receiving bit error rate is reduced. The modulation signal waveforms obtained through calculation according to a Lagrangian function are two sine wave signals with a little difference on amplitude, so that the frequency spectrum utilization rate is highly concentrated on a carrier frequency, no line spectrum component of the high-order harmonic is present, and the band utilization rate is high. In the embodiments of the present disclosure, dual-frequency smoothing amplitude-modulated waveforms have certain sine-like characteristics, the frequency bandwidth is further reduced, and good performance against a time selective fading channel scenario is achieved. Constant-modulus dual-frequency smoothing waveforms in the present disclosure carry symbol information with equal energy, and frequency spectrum leakage can be avoided to some degree.

DETAILED DESCRIPTION

Figure 1:
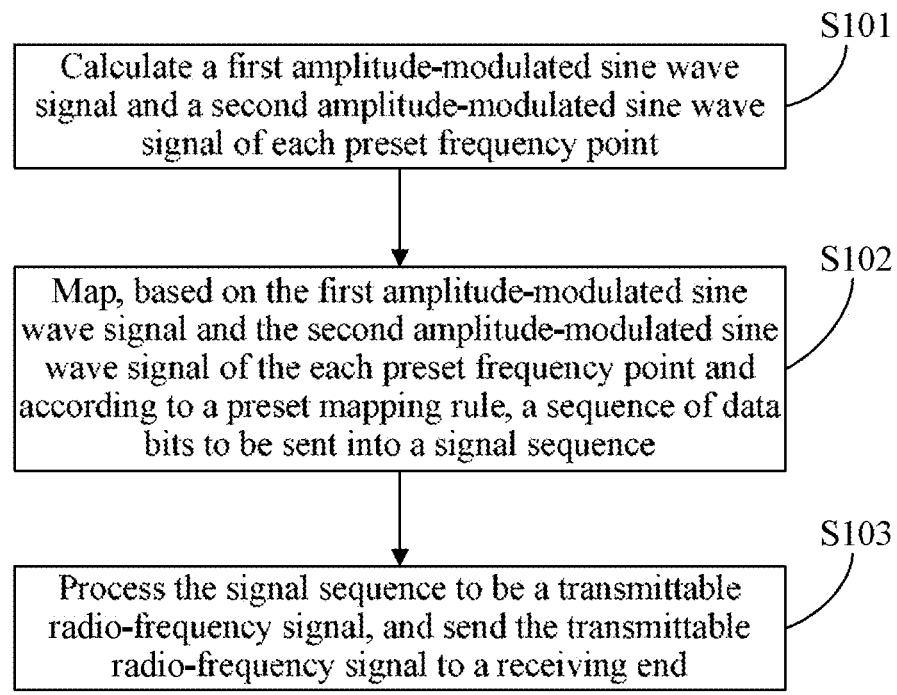
FIG. 1 is a flowchart of a data transmission method based on a modulation signal according to a first embodiment of the present disclosure.

As shown in FIG. 1, a data transmission method based on a modulation signal provided in a first embodiment of the present disclosure is applied to a transmitting end and includes steps described below.

In step S101, a first amplitude-modulated sine wave signal and a second amplitude-modulated sine wave signal with each preset frequency are calculated individually.

In other embodiments, step S101 includes the following: under a preset limiting condition, a maximum Euclidean distance between a first modulation signal and a second modulation signal of the preset frequency is calculated to obtain the first amplitude-modulated sine wave signal and the second amplitude-modulated sine wave signal of the preset frequency.

The limiting condition includes at least one of the following: an Euclidean distance between the modulation signal and a sinusoidal carrier frequency signal of the preset frequency is smaller than a preset distance threshold, waveform energy of the modulation signal is less than a preset energy threshold, or a direct current component of the modulation signal is zero.

In other embodiments, the maximum Euclidean distance between the first modulation signal and the second modulation signal is expressed according to the following formula:

$$\int_0^T (S_1(t) - S_0(t))^2 dt;$$

where T denotes a period of the modulation signal, $S_0(t)$ denotes the first modulation signal, and $S_1(t)$ denotes the second modulation signal.

The limiting condition includes:

$$A \int_0^T (S_1(t) - \sin(\omega_0 t))^2 dt + B \le \alpha,$$

$$A \int_0^T (S_0(t) - \sin(\omega_0 t))^2 dt + B \le \alpha,$$

$$A \int_0^T (S_1(t))^2 dt + B \le E,$$

$$A \int_0^T (S_0(t))^2 dt + B \le E,$$

$$\int_0^T S_1(t) dt = 0, \text{ and}$$

$$\int_0^T S_0(t) dt = 0;$$

where $\sin(\omega_0 t)$ denotes the sinusoidal carrier frequency signal of the preset frequency, $\omega_0$ denotes the preset frequency, $\alpha$ denotes the preset distance threshold, E denotes the preset energy threshold, and A and B are constants.

In the embodiment, in a case where the waveform energy of the modulation signal is limited by E, the Euclidean distance between the modulation signal and the sinusoidal carrier frequency signal is limited by a, and the direct current component of the modulation signal in a unit bit period T is zero, the Euclidean distance between the first modulation signal and the second modulation signal is maximized, so that a better signal detection capacity is obtained. The smaller the Euclidean distance between the modulation signal and the sinusoidal carrier frequency signal is, the more a modulation waveform is approximated to the sinusoidal waveform, that is, the narrower a bandwidth occupied by transmission is; and the direct current component of the modulation signal in the unit bit period T is zero, being beneficial for reducing a signal bandwidth extension of low frequency.

In other embodiments, under the preset limiting condition, the step in which the maximum Euclidean distance between the first modulation signal and the second modulation signal of the preset frequency is calculated to obtain the first amplitude-modulated sine wave signal and the second amplitude-modulated sine wave signal includes the steps described below.

In step A1, a Lagrangian function which is associated with the limiting condition and the maximum Euclidean distance between the first modulation signal and the second modulation signal is obtained through calculation.

The Lagrangian function L is $$L = \int_0^T (S_1(t) - S_0(t))^2 dt + a * \left[ A \int_0^T (S_1(t) - \sin(\omega_0 t))^2 dt + B \right] +$$
$$b * \left[ A \int_0^T (S_0(t) - \sin(\omega_0 t))^2 dt + B \right] +$$
$$c * \left[ A \int_0^T (S_1(t))^2 dt + B \right] + d * \left[ A \int_0^T (S_0(t))^2 dt + B \right] +$$
$$e * \left[ A \int_0^T S_1(t) dt + B \right] + f * \left[ A \int_0^T S_0(t) dt + B \right];$$

where a, b, c, d, e and f denote Lagrangian multipliers, and a≥0, b≥0, c≥0, d≥0, e≥0 and f≥0.

In step A2, in a case where the Lagrangian function is a convex function, an extreme value of the Lagrangian function is calculated to obtain modulation signal waveform function expressions including Lagrangian multipliers.

In a case where the Lagrangian function is the convex function, the Lagrangian multipliers satisfy the following condition:

$$a + c - 1 > 0, \text{ and } \begin{vmatrix} a+c-1 & 1 \\ 1 & b+d-1 \end{vmatrix} > 0.$$

In a case where the Lagrangian function takes a minimum value, the modulation signal waveform functions are as follows:

$$\begin{cases} S_1(t) = \dfrac{[b(a-1) + a(d-1)]\sin(\omega_0 t) + \left[\dfrac{f}{2} - (b+d-1)\dfrac{e}{2}\right]}{(a+c-1)(b+d-1)-1} t \in [0, T] \\ S_0(t) = \dfrac{[a(b-1) + b(c-1)]\sin(\omega_0 t)\left[\dfrac{e}{2} - (a+c-1)\dfrac{f}{2}\right]}{(a+c-1)(b+d-1)-1} t \in [0, T] \end{cases}$$

In order to satisfy the limiting condition that the direct current component of the modulation signal in a unit bit period is zero, the modulation signal waveforms which are obtained through calculation according to the Lagrangian function are as follows:

$$\begin{cases} S_1(t) = \dfrac{[b(a-1) + a(d-1)]\sin(\omega_0 t)}{(a+c-1)(b+d-1)-1} & t \in [0, T] \\ S_0(t) = \dfrac{[a(b-1) + b(c-1)]\sin(\omega_0 t)}{(a+c-1)(b+d-1)-1} & t \in [0, T] \end{cases}$$

In step A3, the modulation signal waveform function expressions are substituted into the Lagrangian function, and convergence values of Lagrangian multipliers are obtained according to a gradient descent method.

With the gradient descent method, the maximum waveform energy of the modulation signal is set to be that E=1 and the carrier frequency is set to be that $\omega_0$=1, a value of an Euclidean distance between the first modulation signal $S_0(t)$ and the sinusoidal carrier frequency signal and a value of an Euclidean distance between the second modulation signal $S_1(t)$ and the sinusoidal carrier frequency signal are adjusted, an optimal initial value of each Lagrangian multiplier is selected by using an appropriate fixed step, and one-dimensional search in a negative gradient direction is performed to obtain $\lambda_{k+1} = \lambda_k + \text{step}_k \nabla L(\lambda_k)$, and $\lambda$=(a, b, c, d), where k denotes the number of iterations. An optimal convergence value of the Lagrangian multiplier is obtained in this way.

Figure 2:
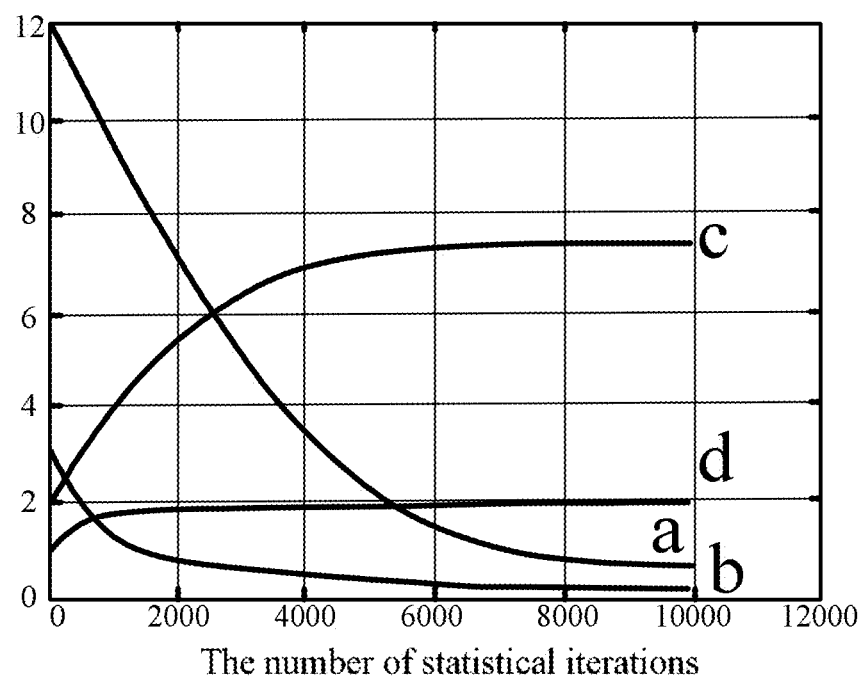
FIG. 2 is a schematic diagram illustrating graphs of convergence of Lagrangian multipliers with the number of iterations according to the first embodiment of the present disclosure.

For example, initial values of the Lagrangian multipliers a, b, c and d are set to 12, 3, 2 and 1 respectively, the Euclidean distance between the first modulation signal $S_0(t)$ and the sinusoidal carrier frequency signal and the Euclidean distance between the second modulation signal $S_1(t)$ and the sinusoidal carrier frequency signal in the simulation are limited by that α=270, so that the optimal convergence values of the Lagrangian multipliers are shown in FIG. 2.

Preferably, the optimal convergence values of the Lagrangian multipliers are as follows: a=0.7, b=0.2, c=7.4 and d=2.

Figure 3:
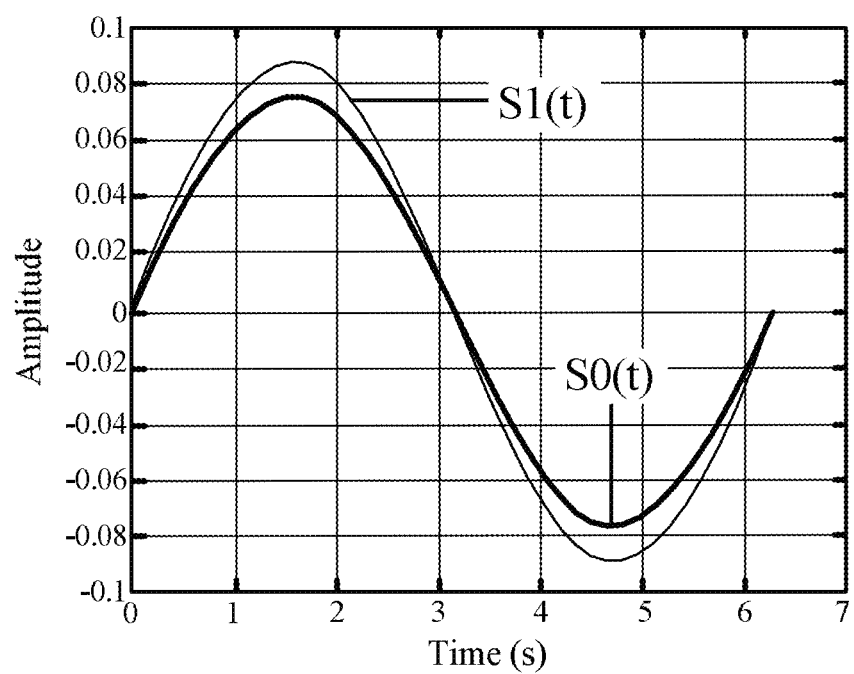
FIG. 3 is a schematic diagram of modulation signal waveforms according to the first embodiment of the present disclosure.

In step A4, the convergence values of the Lagrangian multipliers are substituted into the modulation signal waveform function expressions to obtain the first amplitude-modulated sine wave signal and the second amplitude-modulated sine wave signal as shown in FIG. 3.

Figure 4:
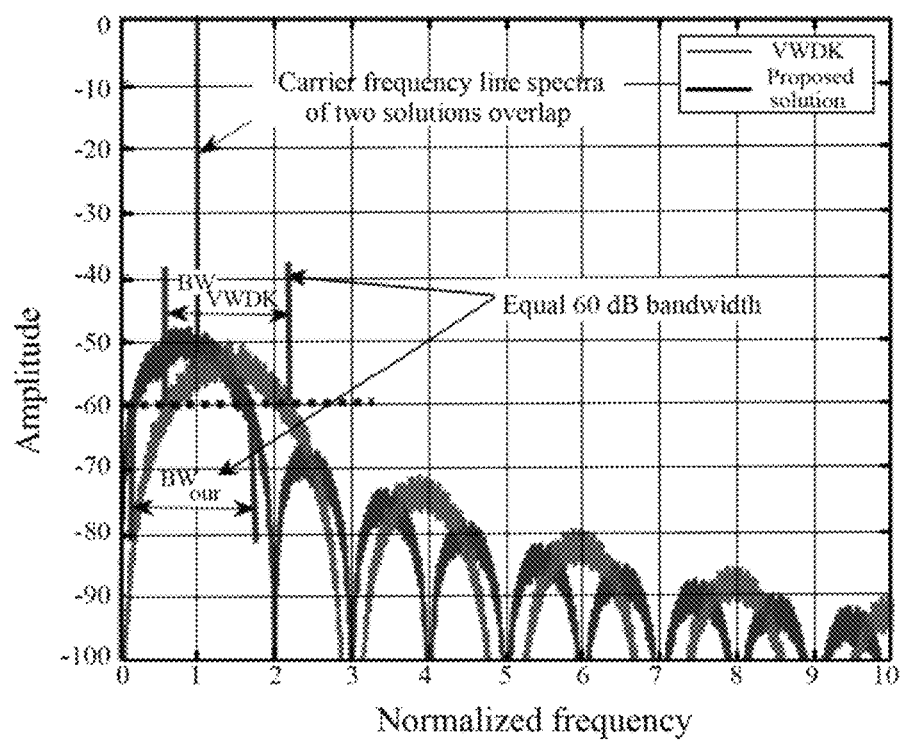
FIG. 4 is a schematic diagram of power spectra (after high-order line spectra are removed) of a modulation signal waveform and very minimum waveform difference keying (VWDK) modulation according to the first embodiment of the present disclosure.
Figure 5:
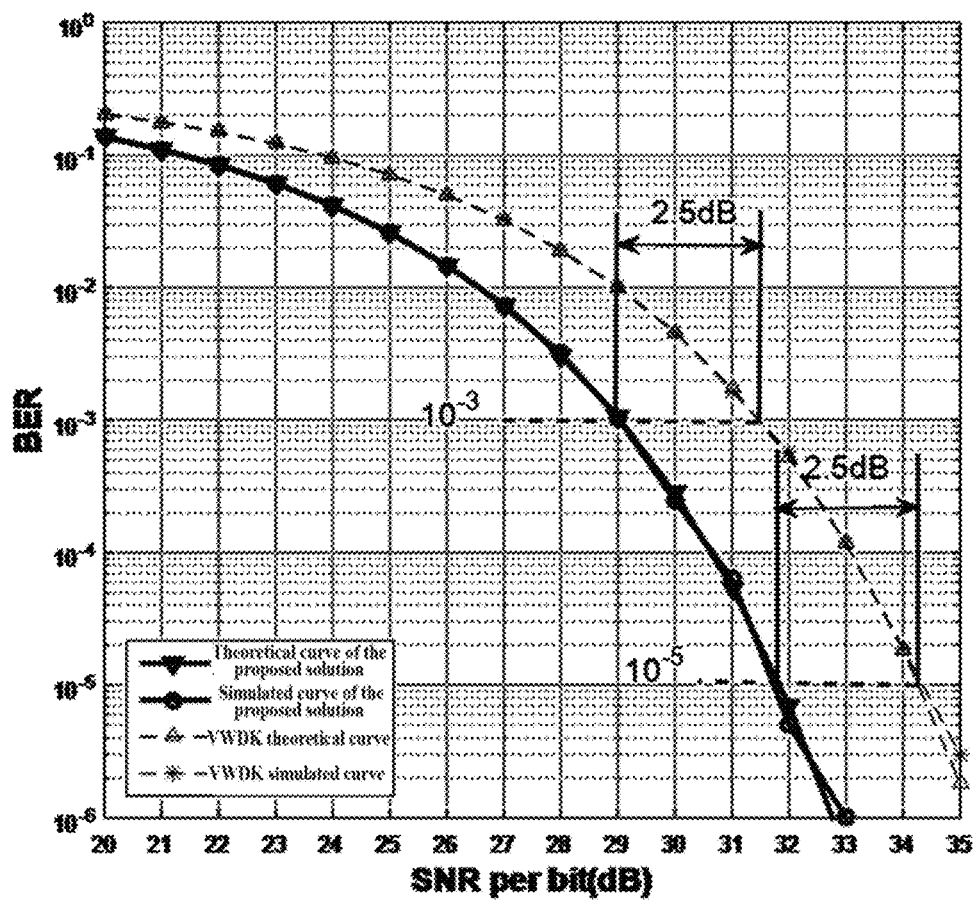
FIG. 5 is a schematic diagram of bit error rate graphs of a modulation signal waveform and VWDK modulation (after high-order line spectra are removed) according to the first embodiment of the present disclosure.

Each modulation signal waveform obtained in the embodiment merely includes a continuous spectrum and a line spectrum component at the carrier frequency, the energy is highly concentrated at the carrier frequency, no other harmonic component is present, and requirements of a narrow-band signal frequency spectrum given by the United States federal communications commission (FCC) are met. According to a bandwidth requirement standard of the FCC, when the modulation signal waveform obtained in the embodiment and a modulation signal waveform obtained by using the VWDK modulation method are the same with the bandwidth of 60 dB (as shown in FIG. 4), bit error rate graphs of the modulation signal waveforms obtained in the embodiment and by using the VWDK modulation method are compared under the maximum-likelihood criterion, as shown in FIG. 5. It is found from the comparison that to achieve the same bit error rate, a gain of 2.5 dB exists between the amplitude-modulated sinusoidal waveforms.

In step S102, based on the first amplitude-modulated sine wave signal and the second amplitude-modulated sine wave signal with the each preset frequency and according to a preset mapping rule, a sequence of data bits to be sent is mapped into a signal sequence.

Figure 6:
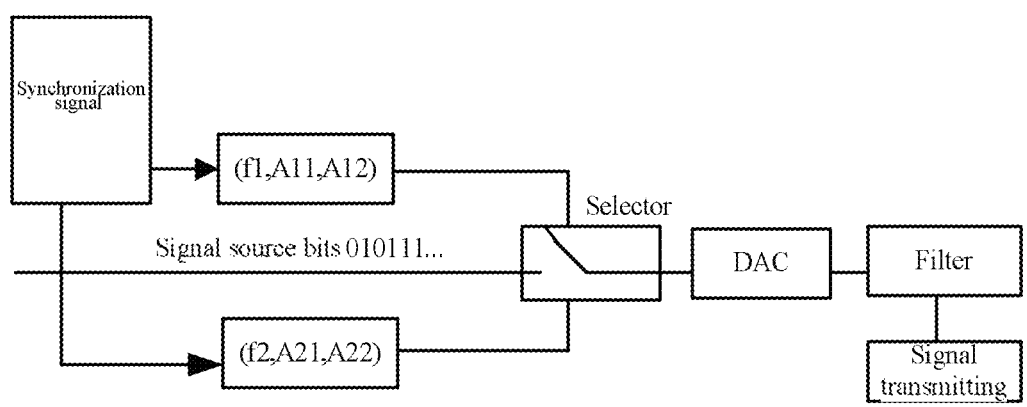
FIG. 6 is a schematic diagram 1 of mapping a sequence of data bits to be sent into a signal sequence according to the first embodiment of the present disclosure.

For example, as shown in FIG. 6, f1 and f2 are two preset frequencies, according to a manner of step S101, a first amplitude-modulated sine wave signal and a second amplitude-modulated sine wave signal which are corresponding to the frequency f1 are calculated and a first amplitude-modulated sine wave signal and a second amplitude-modulated sine wave signal which are corresponding to the frequency f2 are calculated, separately.

(f1, A11, A12) is used for representing characteristics of the modulated waveforms corresponding to the frequency f1, where A11 is an amplitude value of the first amplitude-modulated sine wave signal corresponding to the frequency f1, and A12 is an amplitude value of the second amplitude-modulated sine wave signal corresponding to the frequency f1.

(f2, A21, A22) is used for representing characteristics of the modulated waveforms corresponding to the frequency f2 where A21 is an amplitude value of the first amplitude-modulated sine wave signal corresponding to the frequency f2, and A22 is an amplitude value of the second amplitude-modulated sine wave signal corresponding to the frequency f2.

If a sequence pair of data bits to be sent is 10010, when sending bit 1, a synthetic waveform of the (f1, A11, A12) is adopted, and when sending bit 0, a synthetic waveform of the (f2, A21, A22) is adopted. A sequence of bits to be sent is mapped into to a signal sequence, where the signal sequence corresponds to amplitude information about signal waveforms pre-stored in hardware.

Figure 7:
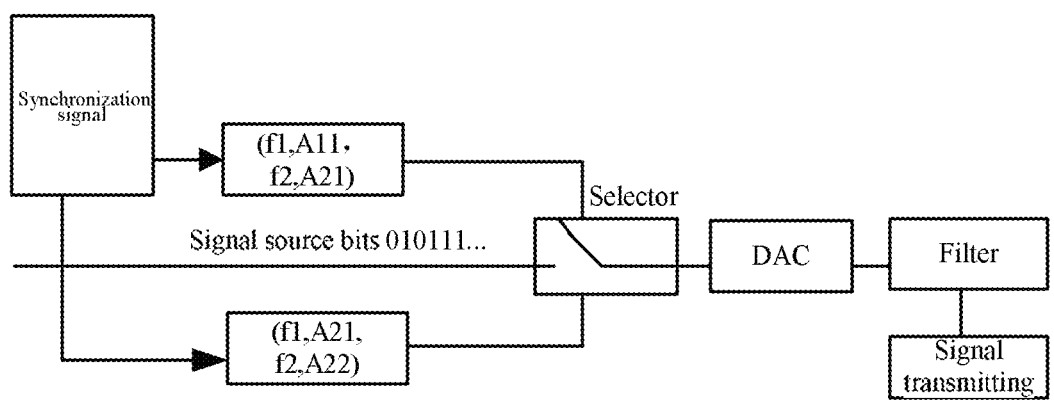
FIG. 7 is a schematic diagram 2 of mapping a sequence of data bits to be sent into a signal sequence according to the first embodiment of the present disclosure.

For another example, as shown in FIG. 7, f1 and f2 are two preset frequencies, according to the manner of step S101, the first amplitude-modulated sine wave signal and the second amplitude-modulated sine wave signal which are corresponding to the frequency f1 are calculated and the first amplitude-modulated sine wave signal and the second amplitude-modulated sine wave signal which are corresponding to the frequency f2 are calculated, separately.

(f1, A11, f2, A12) is used for representing characteristics of the modulation waveforms corresponding to the frequencies f1 and f2, where A11 is the amplitude value of the first amplitude-modulated sine wave signal corresponding to the frequency f1, and A21 is the amplitude value of the first amplitude-modulated sine wave signal corresponding to the frequency f2.

(f1, A12, f2, A22) is used for representing characteristics of the modulation waveforms corresponding to the frequencies f1 and f2, where A12 is the amplitude value of the second amplitude-modulated sine wave signal corresponding to the frequency f1, and A22 is the amplitude value of the second amplitude-modulated sine wave signal corresponding to the frequency f2.

If the sequence pair of data bits to be sent is 10010, when sending bit 1, a synthetic waveform of the (f1, A11, f2, A21) is adopted, and when sending bit 0, a synthetic waveform of the (f1, A12, f2, A22) is adopted. The sequence of bits to be sent is mapped into to a signal sequence, where the signal sequence corresponds to the amplitude information about the signal waveforms pre-stored in hardware.

In step S103, the signal sequence is processed to generate a transmittable radio-frequency signal, and the transmittable radio-frequency signal is sent to a receiving end.

In other embodiments, step S103 includes that the signal sequence is subjected to digital to analog conversion processing and filtering processing in turn to obtain the transmittable radio-frequency signal.

As shown in FIGS. 6 and 7, the signal sequence is converted into an analog signal by a digital to analog converter (DAC), and is subjected to a smoothing filtering processing by a filter.

A data transmission method based on a modulation signal is provided in a second embodiment of the present disclosure, and on the basis of the first amplitude-modulated sine wave signal and the second amplitude-modulated sine wave signal obtained in the first embodiment, as shown, the method includes the steps described below.

In step S201, time-domain coordinates of the first amplitude-modulated sine wave signal is divided into a set number of time-domain segments and time-domain coordinates of the second amplitude-modulated sine wave signal is divided into a set number of time-domain segments, and the first amplitude-modulated sine wave signal is adjusted on each time-domain segment and the second amplitude-modulated sine wave signal is adjusted on each time-domain segment through a polynomial function and a sinusoidal polynomial function to obtain a first dual-frequency smoothing amplitude-modulated wave signal and a second dual-frequency smoothing amplitude-modulated wave signal.

In step S202, according to the first dual-frequency smoothing amplitude-modulated wave signal and the second dual-frequency smoothing amplitude-modulated wave signal, a sequence of data bits to be sent is mapped into a signal sequence.

In step S203, the signal sequence is processed to generate a transmittable radio-frequency signal, and the transmittable radio-frequency signal is sent to a receiving end.

On the basis of modulation signal waveforms obtained in the first embodiment, the influence of time selective fading factors on the modulation signal waveforms should also be considered. In order to meet the requirement that the modulation signal waveforms are easier to distinguish between in the time domain, on the premise of losing certain energy efficiency, secondary high-frequency segmented components of sinusoidal signals are introduced at phases 0 and $\pi$ in the unit symbol period of bits '0' and '1', respectively.

In other embodiments, when time-domain coordinates of the modulation signal waveforms are divided into 5 time-domain segments, and after the modulation signal waveforms are adjusted on each time-domain segment through a polynomial function and based on a sinusoidal polynomial function, the obtained first dual-frequency smoothing amplitude-modulated wave signal and second dual-frequency smoothing amplitude-modulated wave signal are as follows:

$$S_1'(t) = \begin{cases} g * \tilde{a} * \sin^2(\omega_0 t) & t \in [0, t_L) \\ \sum_{i=0}^{3} a_{i1} t^i & t \in [t_L, t_R) \\ \tilde{a} * \sin(\omega_0 t) & t \in [t_R, T - t_R) \\ \sum_{i=0}^{3} b_{i1} t^i & t \in [T - t_R, T - t_L) \\ -g * \tilde{a} * \sin^2(\omega_0 t) & t \in [T - t_L, T) \end{cases} \quad \text{and}$$

$$S_0'(t) = \begin{cases} g * \tilde{b} * \sin^2(\omega_0 t) & t \in [0, t_L) \\ \sum_{i=0}^{3} a_{i0} t^i & t \in [t_L, t_R) \\ \tilde{b} * \sin(\omega_0 t) & t \in [t_R, T - t_R) \\ \sum_{i=0}^{3} b_{i0} t^i & t \in [T - t_R, T - t_L) \\ -g * \tilde{b} * \sin^2(\omega_0 t) & t \in [T - t_L, T) \end{cases} ;$$

where $S_0'(t)$ denotes the adjusted first modulation signal, $S_1'(t)$ denotes the adjusted second modulation signal, $$\tilde{a} = \frac{(b + d - 1)a - b}{(a + c - 1)(b + d - 1) - 1},$$

$$\tilde{b} = \frac{(a + c - 1)b - d}{(a + c - 1)(b + d - 1) - 1},$$

$$g = 1/\sin(\tau), \text{ and}$$

$$0 \leq t_L \leq \tau \leq t_R \leq T/4.$$

In other embodiments, a cubic polynomial function is introduced and high-low dual-frequency signal waveforms are smoothed. Smoothing time points $t_L$ and $t_R$ are selected to minimize differences between the overall waveforms and the sinusoidal waveform as much as possible. A process of determining polynomial coefficients includes the following.

1) At the points of $t=t_L$ and $t=t_R$, $g*\tilde{a}*\sin^2(\omega_0 t)$, $\tilde{a}*\sin(\omega_0 t)$ and the polynomial satisfy continuous differentiability.

$$\begin{bmatrix} 1 & t_L & t_L^2 & t_L^3 \\ 1 & t_R & t_R^2 & t_R^3 \\ 0 & 1 & 2t_L & 3t_L^2 \\ 0 & 1 & 2t_R & 3t_R^2 \end{bmatrix} \begin{bmatrix} a_{01} \\ a_{11} \\ a_{21} \\ a_{31} \end{bmatrix} = \begin{bmatrix} g*\tilde{a}*\sin^2(t_L) \\ \tilde{a}*\sin(t_R) \\ 2g*\tilde{a}*\sin(t_L)*\cos(t_L) \\ \tilde{a}*\cos(t_R) \end{bmatrix}.$$

2) At the points of $t=T-t_R$ and $t=T-t_L$, $\tilde{a}*\sin(\omega_0 t)$, $-g*\tilde{a}*\sin^2(\omega_0 t)$ and the polynomial satisfy continuous differentiability.

$$\begin{bmatrix} 1 & T-t_R & (T-t_R)^2 & (T-t_R)^3 \\ 1 & T-t_L & (T-t_L)^2 & (T-t_L)^3 \\ 0 & 1 & 2(T-t_R) & 3(T-t_R)^2 \\ 0 & 1 & 2(T-t_L) & 3(T-t_L)^2 \end{bmatrix} \begin{bmatrix} b_{01} \\ b_{11} \\ b_{21} \\ b_{31} \end{bmatrix} =$$

$$\begin{bmatrix} \tilde{a}*\sin(T-t_R) \\ -g*\tilde{a}*\sin^2(T-t_L) \\ \tilde{a}*\cos(T-t_R) \\ -2g*\tilde{a}*\sin(T-t_L)*\cos(T-t_L) \end{bmatrix}$$

3) At the points of $t=t_L$ and $t=t_R$, $g*\tilde{b}*\sin^2(\omega_0 t)$, $\tilde{b}*\sin(\omega_0 t)$ and the polynomial satisfy continuous differentiability.

$$\begin{bmatrix} 1 & t_L & t_L^2 & t_L^3 \\ 1 & t_R & t_R^2 & t_R^3 \\ 0 & 1 & 2t_L & 3t_L^2 \\ 0 & 1 & 2t_R & 3t_R^2 \end{bmatrix} \begin{bmatrix} a_{00} \\ a_{10} \\ a_{20} \\ a_{30} \end{bmatrix} = \begin{bmatrix} g*\tilde{b}*\sin^2(t_L) \\ \tilde{b}*\sin(t_R) \\ 2g*\tilde{b}*\sin(t_L)*\cos(t_L) \\ \tilde{b}*\cos(t_R) \end{bmatrix}$$

4) At the points of $t=T-t_R$ and $t=T-t_L$, $\tilde{b}*\sin(\omega_0 t)$, $-g*\tilde{b}*\sin^2(\omega_0 t)$ and the polynomial satisfy continuous differentiability.

$$\begin{bmatrix} 1 & T-t_R & (T-t_R)^2 & (T-t_R)^3 \\ 1 & T-t_L & (T-t_L)^2 & (T-t_L)^3 \\ 0 & 1 & 2(T-t_R) & 3(T-t_R)^2 \\ 0 & 1 & 2(T-t_L) & 3(T-t_L)^2 \end{bmatrix} \begin{bmatrix} b_{00} \\ b_{10} \\ b_{20} \\ b_{30} \end{bmatrix} =$$

$$\begin{bmatrix} \tilde{b}*\sin(T-t_R) \\ -g*\tilde{b}*\sin^2(T-t_L) \\ \tilde{b}*\cos(T-t_R) \\ -2g*\tilde{b}*\sin(T-t_L)*\cos(T-t_L) \end{bmatrix}$$

The differences between modulated waveforms and the sinusoidal waveform are increased or reduced by adjusting values of polynomial smoothing moments $t_L$, $\tau$ and $t_R$.

Figure 8:
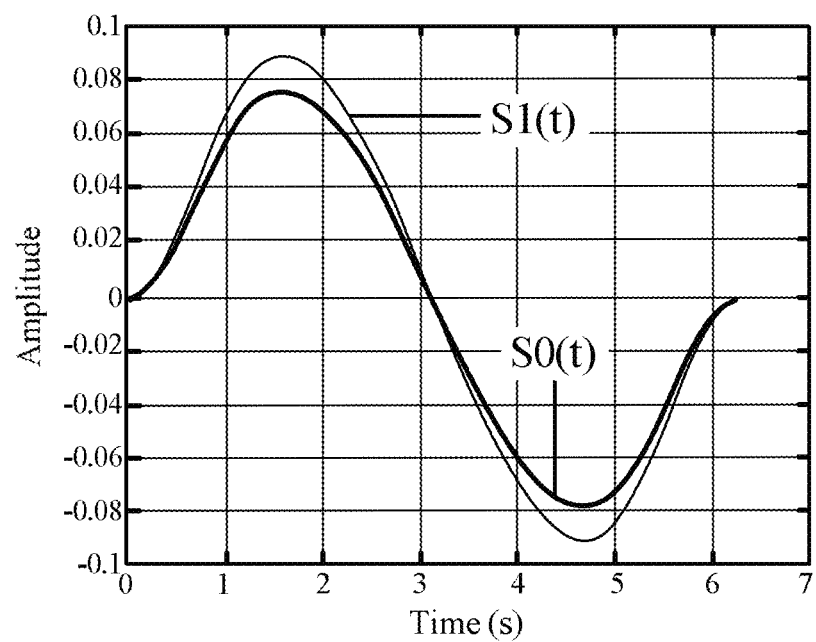
FIG. 8 is a schematic diagram of dual-frequency smoothing amplitude-modulated waveforms according to a second embodiment of the present disclosure.
Figure 9:
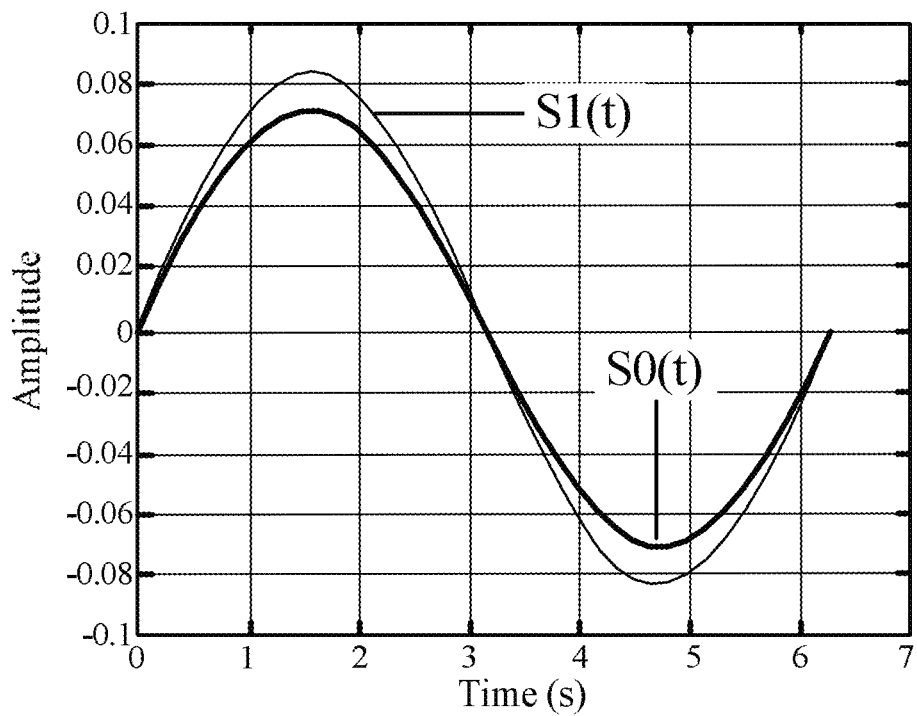
FIG. 9 is a schematic diagram of waveforms of modulation signals removing period components under dual-frequency smoothing amplitude-modulated waveforms according to the second embodiment of the present disclosure.
Figure 10:
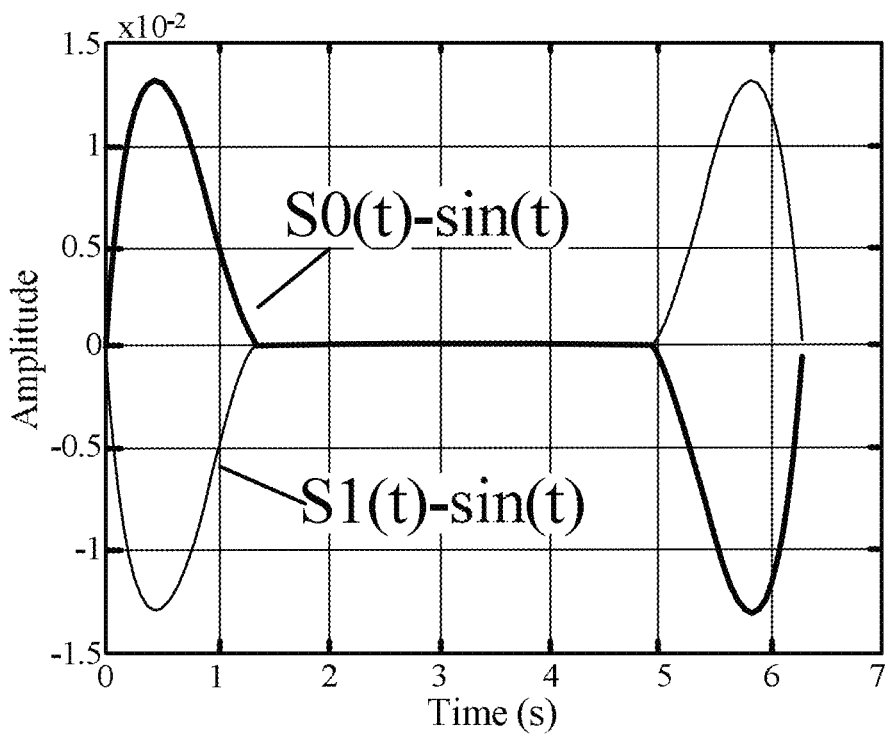
FIG. 10 is a schematic diagram of differences between waveforms of modulation signals removing period components which are obtained under dual-frequency smoothing amplitude-modulated waveforms and a standard sinusoidal signal in a unit bit period according to the second embodiment of the present disclosure.

FIGS. 8, 9 and 10 are exemplary diagrams of dual-frequency smoothing amplitude-modulated waveforms according to an embodiment, and formulas of the high-order line spectrum removal operation performed on the dual-frequency smoothing amplitude-modulated waveforms are $$\begin{cases} s_{11}(t) = (s_1(t) - s_0(t))/2 + A_1\sin(\omega_0 t) \\ s_{00}(t) = (s_0(t) - s_1(t))/2 + A_1\sin(\omega_0 t) \end{cases}.$$

Set $\omega_0=1$, and the embodiment meets the requirements of a narrow-band signal frequency spectrum given by the United States Federal Communications Commission (FCC).

$$A_n = \frac{2}{T}\int_0^T \left(\frac{s_1(t) + s_0(t)}{2}\right)\sin(nt)dt$$

is an amplitude of each-order harmonic $\sin(nt)$.

Figure 11:
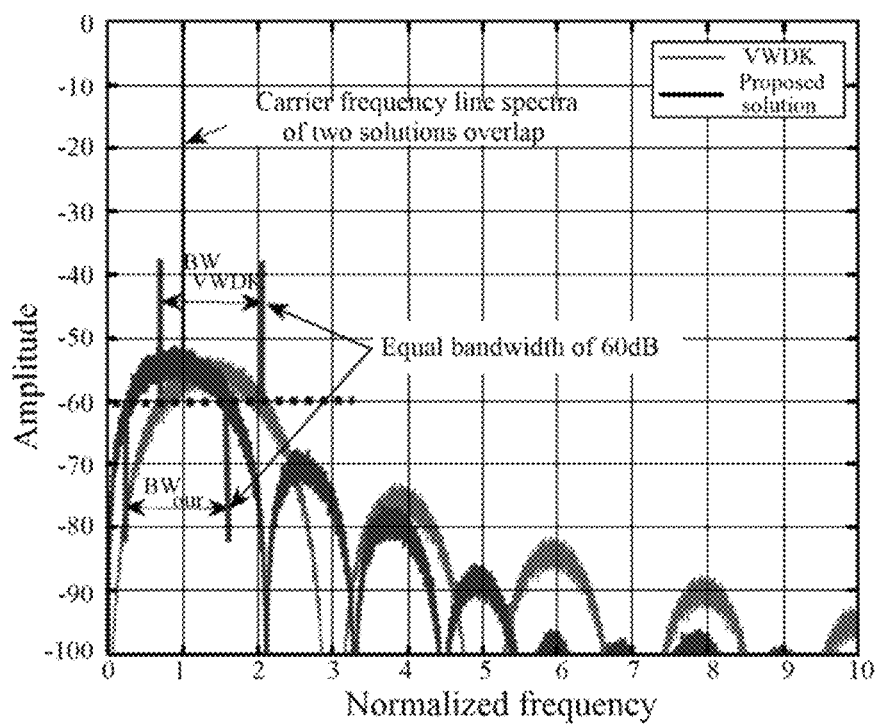
FIG. 11 is a schematic diagram of power spectra (after high-order line spectra are removed) of a dual-frequency smoothing amplitude-modulated waveform and VWDK modulation according to the second embodiment of the present disclosure.
Figure 12:
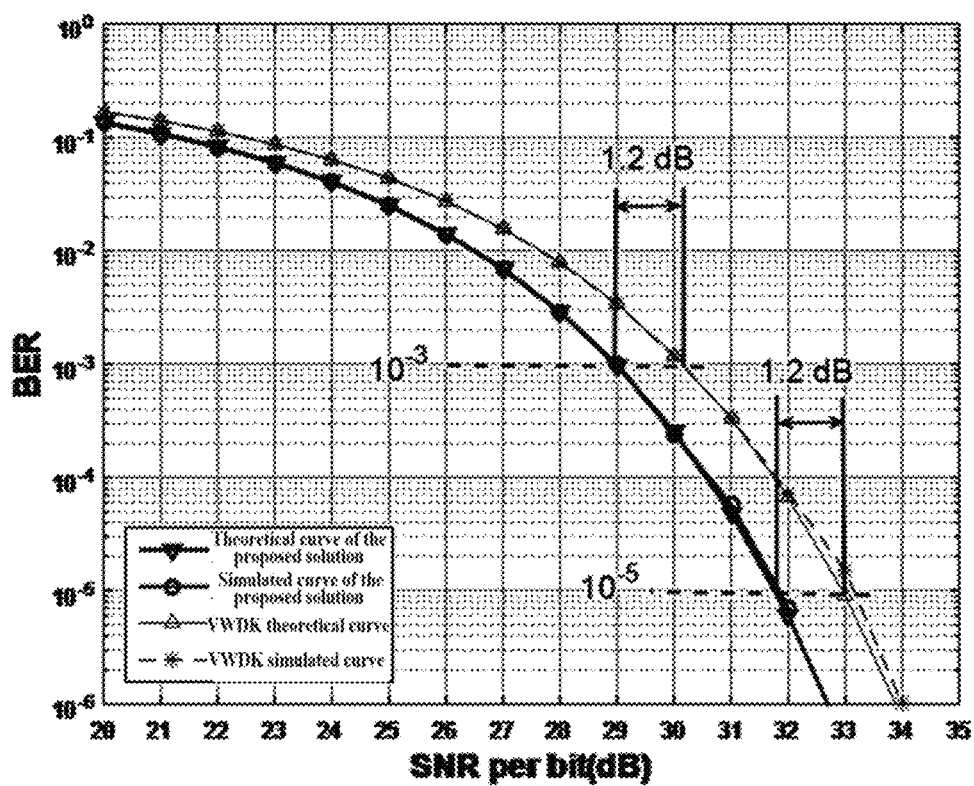
FIG. 12 is a schematic diagram of bit error rate graphs of a dual-frequency smoothing amplitude-modulated waveform and VWDK modulation (after high-order line spectra are removed) according to the second embodiment of the present disclosure.

A frequency spectrum bandwidth of the signal is adjusted by adjusting the polynomial smoothing moments. FIG. 11 illustrates a power spectrum diagram of a dual-frequency smoothing amplitude-modulated waveform with a 60 dB out-of-band power attenuation which meets the FCC requirements and a power spectrum diagram of a VWDK modulation method, bit error rate graphs obtained by using coherent demodulation under the maximum likelihood criterion are shown in FIG. 12. It is found from comparison that to achieve the same bit error rate, the signal-to-noise ratio (SNR) of the VWDK modulation is increased by about 1.2 dB compared with the SNR of the present design solution. That is, bit error performance of the present design solution is superior to that of the VWDK modulation method after line spectrum removal processing is performed under the condition of a same frequency spectrum bandwidth.

A data transmission method based on a modulation signal is provided in a third embodiment of the present disclosure, and on the basis of the first dual-frequency smoothing amplitude-modulated wave signal and the second dual-frequency smoothing amplitude-modulated wave signal obtained in the second embodiment, the method includes the steps described below.

In step S301, the following operations are performed in turn on each of the first dual-frequency smoothing amplitude-modulated wave signal and the second dual-frequency smoothing amplitude-modulated wave signal: removing a sinusoidal carrier frequency signal, removing a high-order harmonic and adding a fundamental component to obtain a first constant-modulus dual-frequency smoothing wave signal and a second constant-modulus dual-frequency smoothing wave signal.

In step S302, according to the first constant-modulus dual-frequency smoothing wave signal and the second constant-modulus dual-frequency smoothing wave signal, a sequence of data bits to be sent is mapped into a signal sequence.

In step S303, the signal sequence is processed to generate a transmittable radio-frequency signal, and the transmittable radio-frequency signal is sent to a receiving end.

Due to the fact that symbol energy of a first modulation signal corresponding to logical information 0 is different from symbol energy of a second modulation signal corresponding to logical information 1, in order to avoid the problem of frequency spectrum leakage, that is, to make a symbol waveform satisfy the characteristic of equal energy transmission, the dual-frequency smoothing amplitude-modulated waveforms are subjected to an equal energy processing operation in the embodiment, and finally, the obtained modulation signals are marked as $S_{1final}(t)$ and $S_{0final}(t)$. Narrow-bandwidth modulated waveforms are acquired through adjustment of values of polynomial smoothing moments $t_L$, $\tau$ and $t_R$ and modulation of final compensated carrier frequency components.

In other embodiments, taking carrier frequency is performed on each of $S_1'(t)$ and $S_0'(t)$ to obtain:

$$S_1''(t) = S_1'(t) - \frac{2}{T}\int_0^T (S_1'(t)\sin(\omega_0 t))dt * \sin(\omega_0 t); \text{ and}$$

$$S_0''(t) = S_0'(t) - \frac{2}{T}\int_0^T (S_0'(t)\sin(\omega_0 t))dt * \sin(\omega_0 t).$$

Other high-order harmonic components are removed to obtain:

$$S_1'''(t) = S_1''(t) - \left(\frac{S_1''(t) + S_0''(t)}{2}\right) \text{ and}$$

$$S_0'''(t) = S_0''(t) - \left(\frac{S_1''(t) + S_0''(t)}{2}\right).$$

Finally, each modulated waveform is added with a fundamental (carrier frequency) component for extracting timing information to obtain:

$$S_{1final}(t) = S_1'''(t) + C * \frac{2}{T}\int_0^T \left(\left(\frac{S_1''(t) + S_0''(t)}{2}\right)\sin(\omega_0 t)\right)dt * \sin(\omega_0 t) \text{ and}$$

$$S_{0final}(t) = S_0'''(t) + C * \frac{2}{T}\int_0^T \left(\left(\frac{S_1''(t) + S_0''(t)}{2}\right)\sin(\omega_0 t)\right)dt * \sin(\omega_0 t);$$

where C is a constant.

Figure 13:
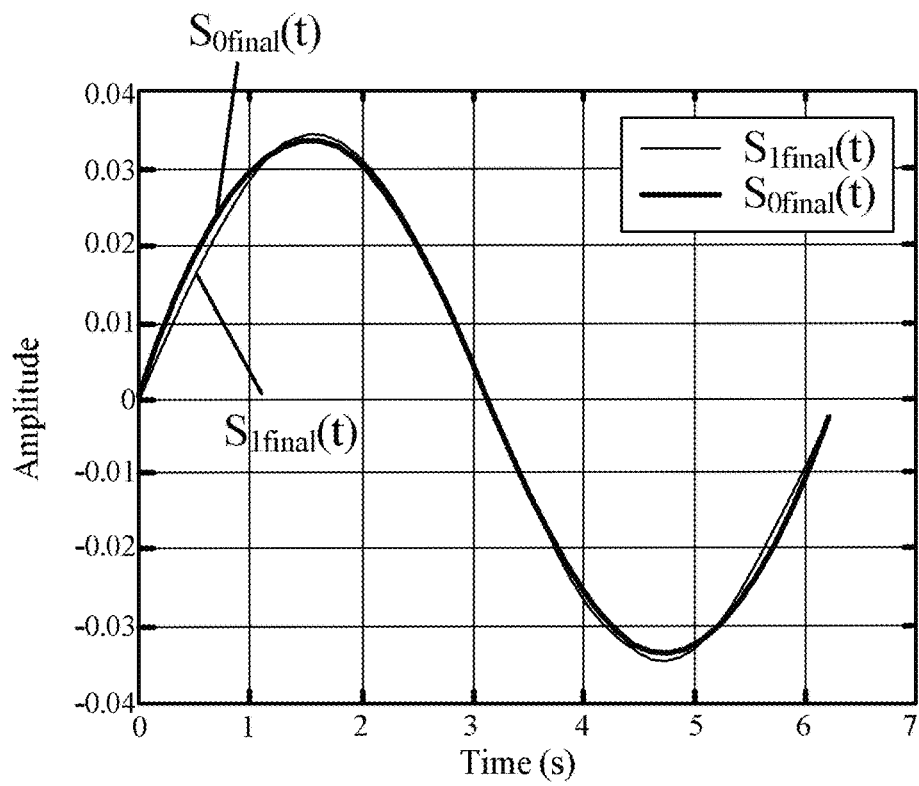
FIG. 13 is a schematic diagram illustrating power spectra of output signals of an original VWDK modulation method according to a third embodiment of the present disclosure.
Figure 14:
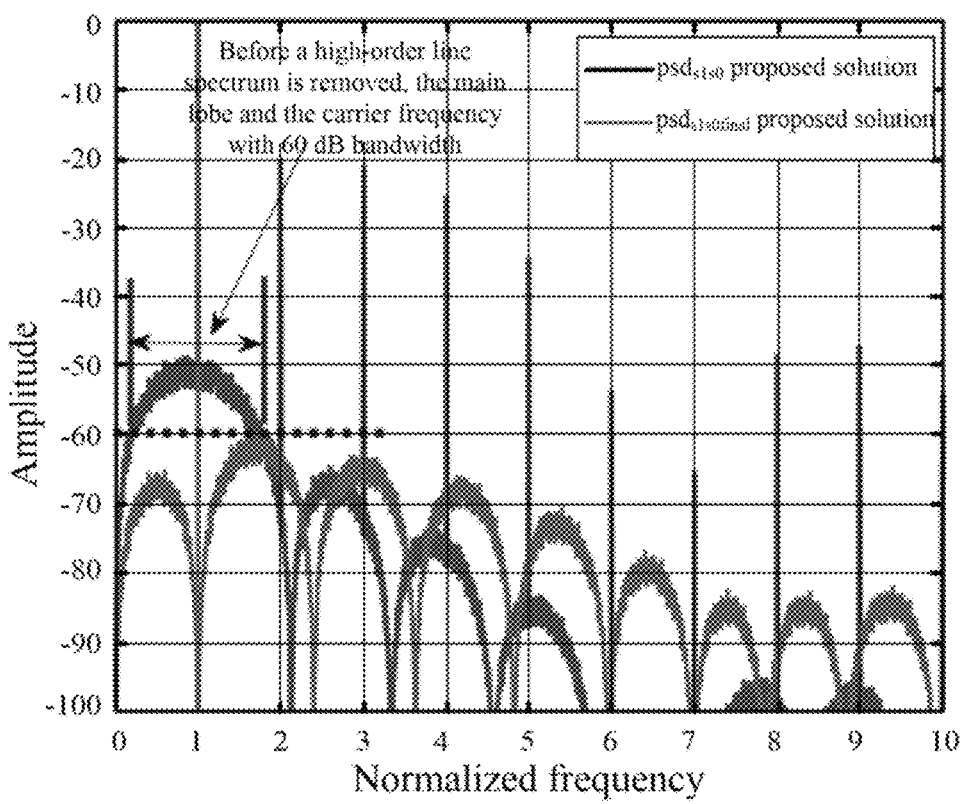
FIG. 14 is a schematic diagram of power spectra of constant-modulus dual-frequency smoothing waveforms according to the third embodiment of the present disclosure.
Figure 15:
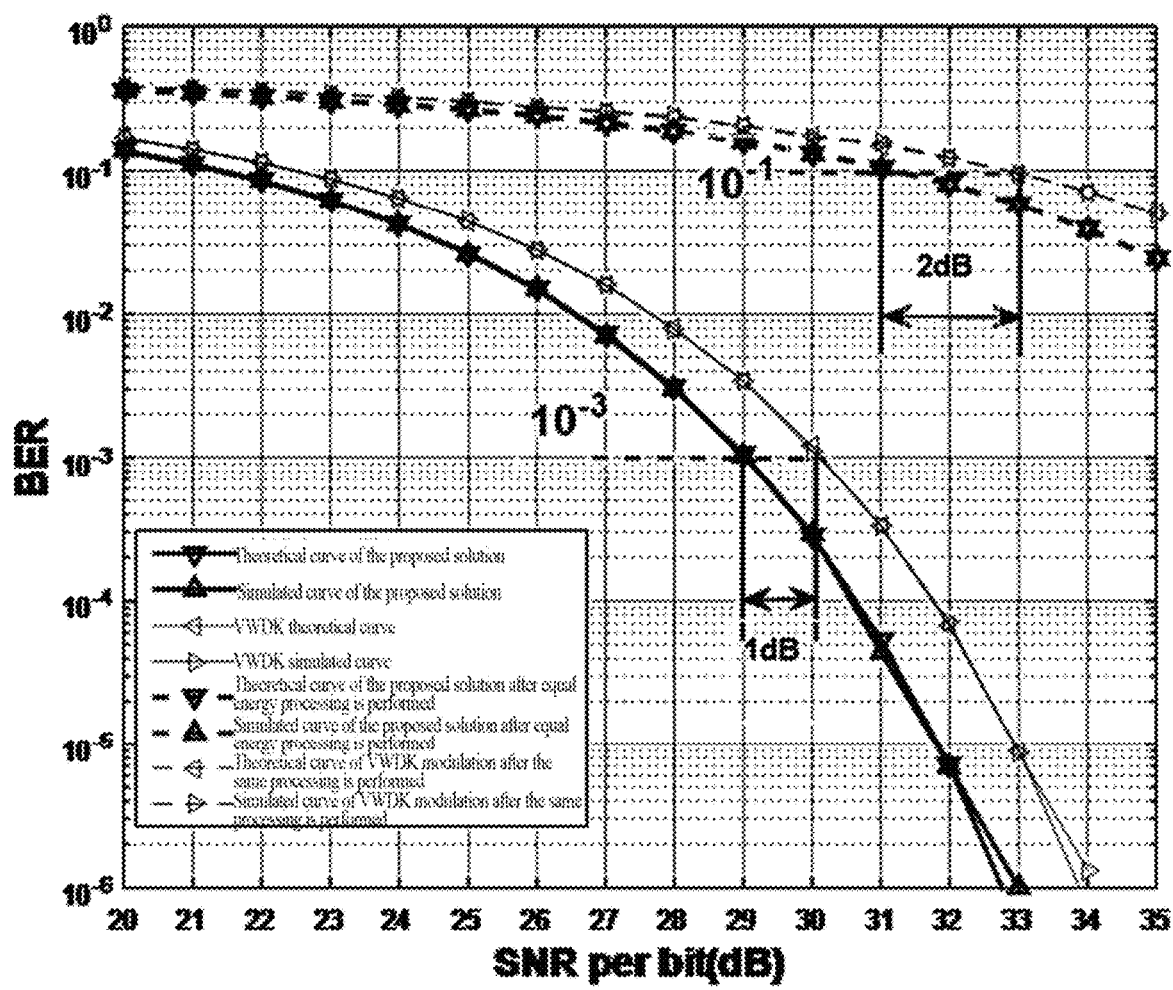
FIG. 15 is a schematic diagram of bit error rate graphs of a constant-modulus dual-frequency smoothing waveform and VWDK modulation according to the third embodiment of the present disclosure.

FIG. 13 shows constant-modulus dual-frequency smoothing waveforms meeting FCC requirements, where $t_L$=0.18, $\tau \times 0.2$, $t_R \times 0.22$. Under the maximum likelihood criterion, bit error rate graphs obtained by using coherent demodulation are shown in FIG. 15. It is found from comparison that when merely main lobes of modulated waveform power spectra and the 60 dB bandwidth of the carrier frequency line spectrum are concerned about (as shown in FIGS. 13 and 14), to achieve the same bit error rate, the signal-to-noise ratio (SNR) of VWDK modulation is increased by about 1 dB compared with the SNR in the present design solution. After equal energy processing is adopted on sending symbol, and in a case where the proposed solution and the VWDK modulation solution have a same extremity narrow bandwidth, the bit error rate after signal processing is performed is higher than a bit error rate before the signal processing is performed, but with the same bit error rate, the signal-to-noise ratio (SNR) of the proposed solution is still lower than the SNR of the VWDK by about 2 dB.

Figure 16:
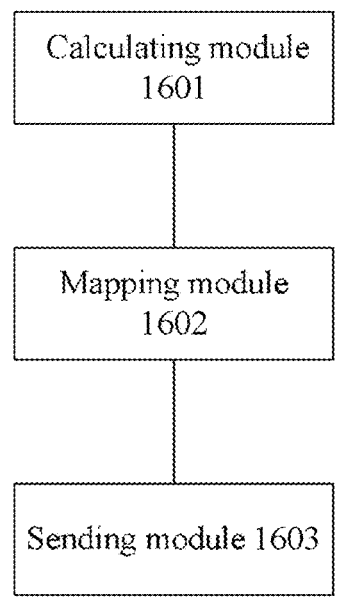
FIG. 16 is a schematic structural diagram of a data transmission apparatus based on a modulation signal according to a fourth embodiment of the present disclosure.

As shown in FIG. 16, a data transmission apparatus based on a modulation signal waveform provided in a fourth embodiment of the present disclosure is applied to a transmitting end and includes: a calculating module 1601, a mapping module 1602 and a sending module 1603.

1) The calculating module 1601 is arranged to obtain, through calculation, a Lagrangian function which is associated with a preset limiting condition and a maximum Euclidean distance between a first modulation signal and a second modulation signal.

In other embodiments, the calculating module 1601 is configured to: obtain, through calculation, the Lagrangian function which is associated with the preset limiting condition and the maximum Euclidean distance between the first modulation signal and the second modulation signal; in a case where the Lagrangian function is a convex function, calculate an extreme value of the Lagrangian function to obtain modulation signal waveform function expressions including Lagrangian multipliers; substitute the modulation signal waveform function expressions into the Lagrangian function and obtain, through calculation, convergence values of the Lagrangian multipliers according to a gradient descent method; and substitute the convergence values of the Lagrangian multipliers into the modulation signal waveform function expressions to obtain a first amplitude-modulated sine wave signal and a second amplitude-modulated sine wave signal.

The limiting condition includes at least one of the following: an Euclidean distance between the modulation signal and a sinusoidal carrier frequency signal of a preset frequency is smaller than a preset distance threshold, waveform energy of the modulation signal is less than a preset energy threshold, or a direct current component of the modulation signal is zero.

2) The mapping module 1602 is arranged to map, based on the first amplitude-modulated sine wave signal and the second amplitude-modulated sine wave signal with the each preset frequency and according to a preset mapping rule, a sequence of data bits to be sent into a signal sequence.

3) The sending module 1603 is arranged to process the signal sequence to generate a transmittable radio-frequency signal, and send the transmittable radio-frequency signal to the receiving end.

In other embodiments, the sending module 1603 is arranged to perform digital to analog conversion processing and filtering processing on the signal sequence in turn to obtain the transmittable radio-frequency signal.

In other embodiments, the apparatus further includes a dual-frequency waveform generating module.

The dual-frequency waveform generating module is arranged to divide time-domain coordinates of the first amplitude-modulated sine wave signal into a set number of time-domain segments and time-domain coordinates of the second amplitude-modulated sine wave signal into a set number of time-domain segments, and adjust the first amplitude-modulated sine wave signal on each time-domain segment and the second amplitude-modulated sine wave signal on each time-domain segment through a polynomial function and a sinusoidal polynomial function to obtain a first dual-frequency smoothing amplitude-modulated wave signal and a second dual-frequency smoothing amplitude-modulated wave signal; map, according to the first dual-frequency smoothing amplitude-modulated wave signal and the second dual-frequency smoothing amplitude-modulated wave signal, the sequence of data bits to be sent into the signal sequence; and process the signal sequence to be the transmittable radio-frequency signal, and send the transmittable radio-frequency signal to the receiving end.

In other embodiments, the apparatus further includes a constant-modulus waveform generating module. The constant-modulus waveform generating module is configured to perform the following operations in turn on each of the first dual-frequency smoothing amplitude-modulated wave signal and the second dual-frequency smoothing amplitude-modulated wave signal: removing a sinusoidal carrier frequency signal, removing a high-order harmonic and adding a fundamental component to obtain a first constant-modulus dual-frequency smoothing wave signal and a second constant-modulus dual-frequency smoothing wave signal; map, according to the first constant-modulus dual-frequency smoothing wave signal and the second constant-modulus dual-frequency smoothing wave signal, the sequence of data bits to be sent into the signal sequence; and process the signal sequence to be the transmittable radio-frequency signal, and send the transmittable radio-frequency signal to the receiving end.

In the data transmission method and apparatus based on the modulation signal waveforms provided in the embodiments of the present disclosure, advantages of the traditional digital communication technology are reserved, a signal transmission frequency spectrum broadband is indirectly or directly constrained by adopting a convex optimization idea, an Euclidean distance between digital signal modulated waveforms is maximized, and the receiving bit error rate is reduced. The modulation signal waveforms obtained through calculation according to a Lagrangian function are two sine wave signals with little difference in amplitude, so that the frequency spectrum utilization rate is highly concentrated on a carrier frequency, no line spectrum component of the high-order harmonic is present, and the band utilization rate is high. In the present disclosure, a dual-frequency smoothing amplitude-modulated waveform has certain sine-like characteristics, the frequency bandwidth is further reduced, and good performance against a time selective fading channel scenario is achieved. A constant modulus dual-frequency smoothing waveform in the present disclosure carries symbol information with equal energy, therefore the frequency spectrum leakage can be prevented to some degree.

It is to be noted that in the embodiments of the present disclosure, the data transmission method based on the modulation signal, if implemented in the form of software functional modules and sold or used as independent products, may also be stored in a computer-readable storage medium. Based on this understanding, the technical solutions provided by the embodiments of the present disclosure substantially, or the part contributing to the existing art, may be embodied in the form of a software product. The computer software product is stored in a storage medium and includes several instructions for enabling a data transmission device to perform all or part of the method provided by each embodiment of the present disclosure. The foregoing storage medium includes: a USB flash disk, a mobile hard disk, a read only memory (ROM), a magnetic disk, an optical disk or other media capable of storing program codes. In this way, the embodiment of the present disclosure is not limited to any particular combination of hardware and software.

Correspondingly, a data transmission device based on a modulation signal provided in an embodiment of the present disclosure includes a memory and a processor, where the memory is arranged to store computer programs executable on the processor and the processor is arranged to implement steps of the data transmission method based on the modulation signal described above when the programs are executed by the processor.

A computer-readable storage medium is further provided in an embodiment of the present disclosure, which is arranged to store computer programs for implementing steps of the data transmission method based on the modulation signal described above when the computer programs are executed by a processor.

It is to be noted that: description of the above storage medium and device embodiments is similar to description of the above method embodiments, and the storage medium and device embodiments have similar beneficial effects to the method embodiments. For technical details not disclosed in the storage medium and device embodiments of the present disclosure, reference may be made to the description of the method embodiments of the present disclosure for understanding.

Figure 17:
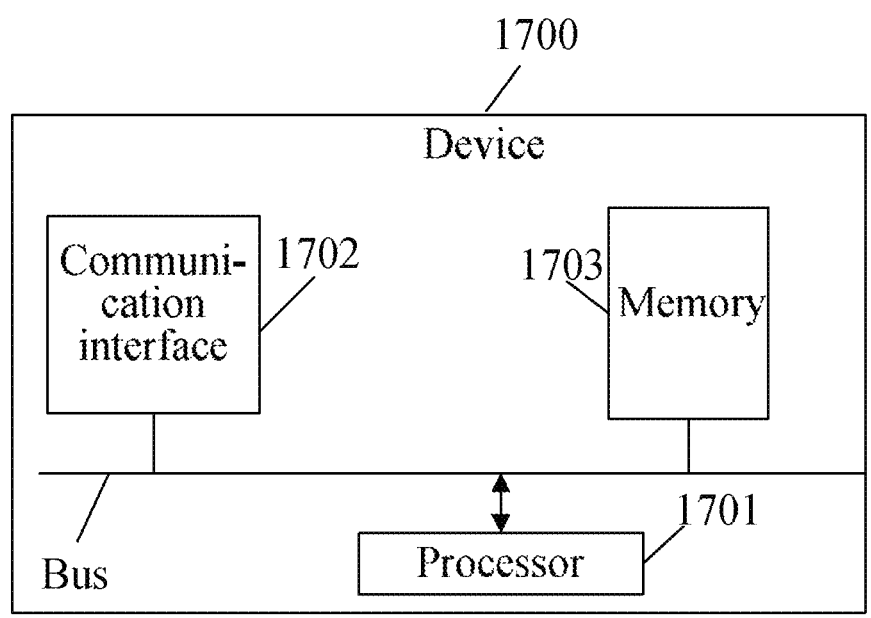
FIG. 17 is a hardware entity schematic diagram of a data transmission device based on a modulation signal according to an embodiment of the present disclosure.

It is to be noted that FIG. 17 is a hardware entity schematic diagram of a data transmission device based on a modulation signal according to an embodiment of the present disclosure. As shown in FIG. 17, the hardware entities of the device 1700 include a processor 1701, a communication interface 1702 and a memory 1703.

The processor 1701 is usually arranged to control overall operations of the device 1700.

The communication interface 1702 may enable the device to communicate with other terminals or servers over a network.

The memory 1703 is arranged to store instructions and applications which are executable by the processor 1701 and may further be arranged to cache data to be processed or already processed by the processor 1701 and respective modules in the device 1700, and may be implemented by a flash or a random access memory (RAM).

It should be understood that "one embodiment" or "an embodiment" mentioned throughout the specification refers to that particular features, structures or characteristics related to the embodiments are included in at least one embodiment of the present disclosure. Therefore, the phrase "in one embodiment" or "in an embodiment" appearing in various places throughout the specification is not necessarily referring to the same embodiment. In addition, these particular features, structures or characteristics may be combined in one or more embodiments in any suitable manner. It should be understood that in various embodiments of the present disclosure, the serial numbers of the above processes do not mean the execution order and the execution order of the above processes should be determined according to their functions and internal logics, which should not limit the implementation processes of the present disclosure in any improper way. The serial numbers of the embodiments described above of the present disclosure are merely for ease of description and do not indicate superiority and inferiority of the embodiments.

Through the description of the embodiments, the technical means adopted by the present disclosure for achieving predetermined purposes and efficacy can be further understood, but the drawings are merely intended to provide references and explanations and are not intended to limit the present disclosure.

What is claimed is:
1. A data transmission method based on a modulation signal, applied to a transmitting end and comprising:

calculating a first amplitude-modulated sine wave signal and a second amplitude-modulated sine wave signal with each preset frequency individually;

mapping, based on the first amplitude-modulated sine wave signal and the second amplitude-modulated sine wave signal with the each preset frequency and according to a preset mapping rule, a sequence of data bits to be sent into a signal sequence; and processing the signal sequence to generate a transmittable radio-frequency signal, and sending the transmittable radio-frequency signal to a receiving end.

2. The data transmission method of claim 1, wherein the calculating the first amplitude-modulated sine wave signal and the second amplitude-modulated sine wave signal with the each preset frequency individually comprises:

under a preset limiting condition, calculating a maximum Euclidean distance between a first modulation signal and a second modulation signal with the each preset frequency to obtain the first amplitude-modulated sine wave signal and the second amplitude-modulated sine wave signal with the each preset frequency;

wherein the preset limiting condition comprises at least one of the following: an Euclidean distance between the modulation signal and a sinusoidal carrier frequency signal with the each preset frequency is smaller than a preset distance threshold, waveform energy of the modulation signal is less than a preset energy threshold, or a direct current component of the modulation signal is zero.

3. The data transmission method of claim 2, wherein the under the preset limiting condition, calculating the maximum Euclidean distance between the first modulation signal and the second modulation signal with the each preset frequency to obtain the first amplitude-modulated sine wave signal and the second amplitude-modulated sine wave signal with the each preset frequency comprises:

obtaining a Lagrangian function which is associated with the preset limiting condition and the maximum Euclidean distance between the first modulation signal and the second modulation signal through calculation;

in a case where the Lagrangian function is a convex function, calculating an extreme value of the Lagrangian function to obtain modulation signal waveform function expressions comprising Lagrangian multipliers;

substituting the modulation signal waveform function expressions into the Lagrangian function, and obtaining convergence values of the Lagrangian multipliers according to a gradient descent method; and substituting the convergence values of the Lagrangian multipliers into the modulation signal waveform function expressions to obtain the first amplitude-modulated sine wave signal and the second amplitude-modulated sine wave signal with the each preset frequency.

4. The data transmission method of claim 3, wherein the maximum Euclidean distance between the first modulation signal and the second modulation signal is expressed according to a following formula:

$$\int_0^T (S_1(t) - S_0(t))^2 dt;$$

wherein T denotes a period of the modulation signal, $S_0(t)$ denotes the first modulation signal, and $S_1(t)$ denotes the second modulation signal;

wherein the preset limiting condition comprises:

$$A \int_0^T (S_1(t) - \sin(\omega_0 t))^2 dt + B \leq \alpha,$$

$$A \int_0^T (S_0(t) - \sin(\omega_0 t))^2 dt + B \leq \alpha,$$

$$A \int_0^T (S_1(t))^2 dt + B \leq E,$$

$$A \int_0^T (S_0(t))^2 dt + B \leq E,$$

$$\int_0^T S_1(t) dt = 0, \text{ and}$$

$$\int_0^T S_0(t) dt = 0;$$

wherein $\sin(\omega_0 t)$ denotes the sinusoidal carrier frequency signal of the each preset frequency, $\omega_0$ denotes the each preset frequency, $\alpha$ denotes the preset distance threshold, E denotes the preset energy threshold, and A and B are constants.

5. The data transmission method of claim 4, wherein in the case where the Lagrangian function is the convex function, the Lagrangian multipliers satisfy following conditions:

$$a + c - 1 > 0, \text{ and } \begin{vmatrix} a + c - 1 & 1 \\ 1 & b + d - 1 \end{vmatrix} > 0;$$

wherein a denotes a Lagrangian multiplier of $$A \int_0^T (S_1(t) - \sin(\omega_0 t))^2 dt + B \leq \alpha$$

in the Lagrangian function, b denotes a Lagrangian multiplier of $$A \int_0^T (S_0(t) - \sin(\omega_0 t))^2 dt + B \leq \alpha$$

in the Lagrangian function, c denotes a Lagrangian multiplier of in $$A \int_0^T (S_1(t))^2 dt + B \leq E$$

the Lagrangian function, and d denotes a Lagrangian multiplier of $$A \int_0^T (S_0(t))^2 dt + B \leq E$$

in the Lagrangian function.

6. The data transmission method of claim 5, wherein the first amplitude-modulated sine wave signal and the second amplitude-modulated sine wave signal which are obtained through calculation according to the Lagrangian function are:

$$\begin{cases} S_1(t) = \frac{[b(a-1)+a(d-1)]\sin(\omega_0 t)}{(a+c-1)(b+d-1)-1} & t \in [0, T] \\ S_0(t) = \frac{[a(b-1)+b(c-1)]\sin(\omega_0 t)}{(a+c-1)(b+d-1)-1} & t \in [0, T] \end{cases}.$$

7. The data transmission method of claim 1, wherein the processing the signal sequence to be the transmittable radio-frequency signal comprises:
performing digital to analog conversion processing and filtering processing on the signal sequence in turn to obtain the transmittable radio-frequency signal.

8. The data transmission method of claim 1, further comprising:
dividing time-domain coordinates of the first amplitude-modulated sine wave signal into a set number of time-domain segments and dividing time-domain coordinates of the second amplitude-modulated sine wave signal into a set number of time-domain segments, and adjusting the first amplitude-modulated sine wave signal on each of the set number of time-domain segments and the second amplitude-modulated sine wave signal on each of the set number of time-domain segments through a polynomial function and a sinusoidal polynomial function to obtain a first dual-frequency smoothing amplitude-modulated wave signal and a second dual-frequency smoothing amplitude-modulated wave signal;
mapping, according to the first dual-frequency smoothing amplitude-modulated wave signal and the second dual-frequency smoothing amplitude-modulated wave signal, the sequence of data bits to be sent into the signal sequence; and
processing the signal sequence to be the transmittable radio-frequency signal, and sending the transmittable radio-frequency signal to the receiving end.

9. The data transmission method of claim 8, further comprising:
performing following operations in turn on each of the first dual-frequency smoothing amplitude-modulated wave signal and the second dual-frequency smoothing amplitude-modulated wave signal: removing a sinusoidal carrier frequency signal, removing a high-order harmonic and adding a fundamental component, to obtain a first constant-modulus dual-frequency smoothing wave signal and a second constant-modulus dual-frequency smoothing wave signal;
mapping, according to the first constant-modulus dual-frequency smoothing wave signal and the second constant-modulus dual-frequency smoothing wave signal, the sequence of data bits to be sent into the signal sequence; and
processing the signal sequence to be the transmittable radio-frequency signal, and sending the transmittable radio-frequency signal to the receiving end.

10. A non-transitory computer-readable storage medium, which stores computer programs, wherein the computer programs, when executed by a processor, implement steps of the data transmission method based on the modulation signal of claim 1.

11. A data transmission device based on a modulation signal, comprising a memory and a processor, wherein the memory stores computer programs executable on the processor and the processor implements steps of a data transmission method based on the modulation signal when the programs are executed by the processor, wherein the data transmission method comprises:
calculating a first amplitude-modulated sine wave signal and a second amplitude-modulated sine wave signal with each preset frequency individually;
mapping, based on the first amplitude-modulated sine wave signal and the second amplitude-modulated sine wave signal with the each preset frequency and according to a preset mapping rule, a sequence of data bits to be sent into a signal sequence; and
processing the signal sequence to generate a transmittable radio-frequency signal, and sending the transmittable radio-frequency signal to a receiving end.

12. The data transmission device of claim 11, wherein the calculating the first amplitude-modulated sine wave signal and the second amplitude-modulated sine wave signal with the each preset frequency individually comprises:
under a preset limiting condition, calculating a maximum Euclidean distance between a first modulation signal and a second modulation signal with the each preset frequency to obtain the first amplitude-modulated sine wave signal and the second amplitude-modulated sine wave signal with the each preset frequency;
wherein the preset limiting condition comprises at least one of the following: an Euclidean distance between the modulation signal and a sinusoidal carrier frequency signal with the each preset frequency is smaller than a preset distance threshold, waveform energy of the modulation signal is less than a preset energy threshold, or a direct current component of the modulation signal is zero.

13. The data transmission device of claim 12, wherein the under the preset limiting condition, calculating the maximum Euclidean distance between the first modulation signal and the second modulation signal with the each preset frequency to obtain the first amplitude-modulated sine wave signal and the second amplitude-modulated sine wave signal with the each preset frequency comprises:
obtaining a Lagrangian function which is associated with the preset limiting condition and the maximum Euclidean distance between the first modulation signal and the second modulation signal through calculation;
in a case where the Lagrangian function is a convex function, calculating an extreme value of the Lagrangian function to obtain modulation signal waveform function expressions comprising Lagrangian multipliers;
substituting the modulation signal waveform function expressions into the Lagrangian function, and obtaining convergence values of the Lagrangian multipliers according to a gradient descent method; and
substituting the convergence values of the Lagrangian multipliers into the modulation signal waveform function expressions to obtain the first amplitude-modulated sine wave signal and the second amplitude-modulated sine wave signal with the each preset frequency.

14. The data transmission device of claim 13, wherein the maximum Euclidean distance between the first modulation signal and the second modulation signal is expressed according to a following formula:

$$\int_0^T (S_1(t) - S_0(t))^2 dt;$$

wherein T denotes a period of the modulation signal, $S_0(t)$ denotes the first modulation signal, and $S_1(t)$ denotes the second modulation signal;

wherein the preset limiting condition comprises:

$$A \int_0^T (S_1(t) - \sin(\omega_0 t))^2 dt + B \leq \alpha,$$

$$A \int_0^T (S_0(t) - \sin(\omega_0 t))^2 dt + B \leq \alpha,$$

$$A \int_0^T (S_1(t))^2 dt + B \leq E,$$

$$A \int_0^T (S_0(t))^2 dt + B \leq E,$$

$$\int_0^T S_1(t) dt = 0, \text{ and}$$

$$\int_0^T S_0(t) dt = 0;$$

wherein $\sin(\omega_0 t)$ denotes the sinusoidal carrier frequency signal of the each preset frequency, $\omega_0$ denotes the each preset frequency, $\alpha$ denotes the preset distance threshold, E denotes the preset energy threshold, and A and B are constants.

15. The data transmission device of claim 14, wherein in the case where the Lagrangian function is the convex function, the Lagrangian multipliers satisfy following conditions:

$$a + c - 1 > 0, \text{ and } \begin{vmatrix} a+c-1 & 1 \\ 1 & b+d-1 \end{vmatrix} > 0;$$

wherein a denotes a Lagrangian multiplier of $$A \int_0^T (S_1(t) - \sin(\omega_0 t))^2 dt + B \leq \alpha$$

in the Lagrangian function, b denotes a Lagrangian multiplier of $$A \int_0^T (S_0(t) - \sin(\omega_0 t))^2 dt + B \leq \alpha$$

in the Lagrangian function, c denotes a Lagrangian multiplier of $$A \int_0^T (S_1(t))^2 dt + B \leq E \text{ in}$$

the Lagrangian function, and d denotes a Lagrangian multiplier of $$A \int_0^T (S_0(t))^2 dt + B \leq E$$

in the Lagrangian function.

16. The data transmission device of claim 15, wherein the first amplitude-modulated sine wave signal and the second amplitude-modulated sine wave signal which are obtained through calculation according to the Lagrangian function are:

$$\begin{cases} S_1(t) = \frac{[b(a-1) + a(d-1)]\sin(\omega_0 t)}{(a+c-1)(b+d-1)-1} & t \in [0, T] \\ S_0(t) = \frac{[a(b-1) + b(c-1)]\sin(\omega_0 t)}{(a+c-1)(b+d-1)-1} & t \in [0, T] \end{cases}.$$

17. The data transmission device of claim 11, wherein the processing the signal sequence to be the transmittable radio-frequency signal comprises:
performing digital to analog conversion processing and filtering processing on the signal sequence in turn to obtain the transmittable radio-frequency signal.

18. The data transmission device of claim 11, further comprising:
dividing time-domain coordinates of the first amplitude-modulated sine wave signal into a set number of time-domain segments and dividing time-domain coordinates of the second amplitude-modulated sine wave signal into a set number of time-domain segments, and adjusting the first amplitude-modulated sine wave signal on each of the set number of time-domain segments and the second amplitude-modulated sine wave signal on each of the set number of time-domain segments through a polynomial function and a sinusoidal polynomial function to obtain a first dual-frequency smoothing amplitude-modulated wave signal and a second dual-frequency smoothing amplitude-modulated wave signal;
mapping, according to the first dual-frequency smoothing amplitude-modulated wave signal and the second dual-frequency smoothing amplitude-modulated wave signal, the sequence of data bits to be sent into the signal sequence; and
processing the signal sequence to be the transmittable radio-frequency signal, and sending the transmittable radio-frequency signal to the receiving end.

19. The data transmission device of claim 18, further comprising:
performing following operations in turn on each of the first dual-frequency smoothing amplitude-modulated wave signal and the second dual-frequency smoothing amplitude-modulated wave signal: removing a sinusoidal carrier frequency signal, removing a high-order harmonic and adding a fundamental component, to obtain a first constant-modulus dual-frequency smoothing wave signal and a second constant-modulus dual-frequency smoothing wave signal;
mapping, according to the first constant-modulus dual-frequency smoothing wave signal and the second constant-modulus dual-frequency smoothing wave signal, the sequence of data bits to be sent into the signal sequence; and
processing the signal sequence to be the transmittable radio-frequency signal, and sending the transmittable radio-frequency signal to the receiving end.

* * * * *